July 24, 1951
G. BAILHE
2,561,487
CABLE MOORING PENNANT
Filed July 15, 1948
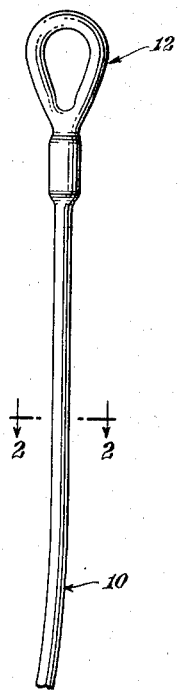
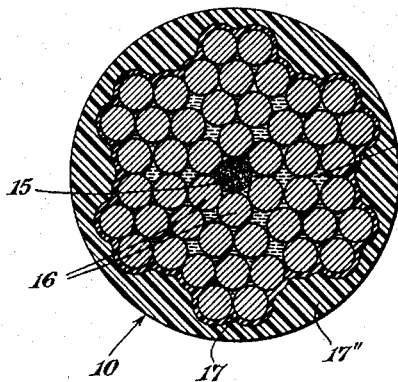
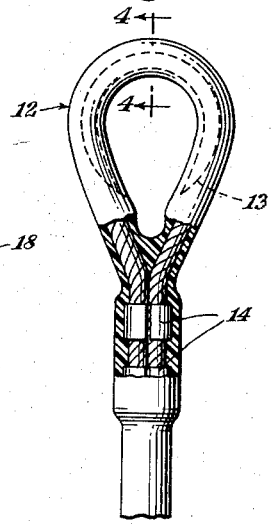
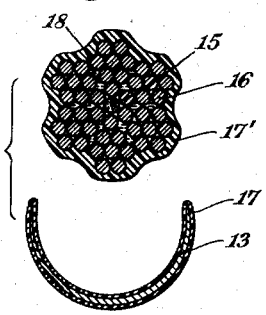
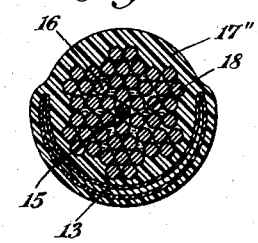
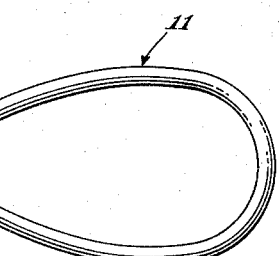
INVENTOR.
George Bailhe.
BY
ATTORNEY.

Patented July 24, 1951

2,561,487

UNITED STATES PATENT OFFICE 2,561,487

CABLE MOORING PENNANT

George Bailhe, Brooklyn, N. Y.

Application July 15, 1948, Serial No. 38,847

1 Claim. (Cl. 114—230)

This invention relates generally to wire cable constructions, to articles made from wire cables, such as mooring pennants, and to the method of producing cables and cable articles.

Work cables, such as generally used in industry, and wire cables and articles made from cables and especially the kind intended for marine usage, such as mooring pennants and the like, are subject to unusual exposure to weather, salt air and moisture in addition to the wear and tear for which they are normally designed. In order to minimize such wear and tear, most wire cables are thoroughly lubricated as they are being fabricated and are usually provided with a lubricant-carrying core, about which latter are successively grouped layers of wires, wire strands and other cable constituents. A lubricating core usually comprises a wick-like cord made from either fibre, paper or other absorbent material, its purpose being to retain a substantial amount of lubricant and to maintain the surrounding cable constituents sufficiently well lubricated, thereby rendering the cable pliable, reduce friction between the cable constituents and generally slow down cable deterioration.

These functions of the lubricant-carrying core and of the supplied lubricant will continue as long as the cable retains a sufficient amount of the lubricant. If, however, the cable or an article made therefrom is exposed for an extended period of time to various weather conditions, the lubricant becomes gradually dissipated until none is left. In consequence of the loss of lubricant, the cable constituents start to rub against one another, become corroded, the cable becomes stiff and its wire and wire strands commence to break. Not only is the life of lubricant-poor cables and of articles made from them, materially shortened, but they constitute eminent hazard to those handling them.

It is one of the prime objects of the present invention to provide wire cables, and articles made therefrom which will retain the originally supplied lubricant between the cable constituents for practically the entire useful life of the cables and articles, and which cables and articles are protected not only against the loss of lubricant, but also against abrasion, wear and tear by objects with which they are to come in contact.

Another major object of the present invention is the method of rendering the outer surface of a cable or of articles made therefrom impervious to water, mineral and vegetable oils and greases, thereby trapping lubricant placed within the cable and rendering impossible its escape to without the cable structure, and at the same time preventing moisture from penetrating into the cable structure, and in addition effectively protecting the cable body against abrasion.

A further object of this invention is the provision of articles made from wire cables, such as mooring pennants, which are usually composed of several metal parts, and wherein each of the metal parts is individually covered by a flexible, strong, tough, continuous and abrasion-resisting, water- and lubricant-impervious protective layer or layers of a fused plastic, and wherein the different plastic-covered parts are assembled, and, when thus assembled, are recovered with one or more additional layers of the same plastic, the individual application of plastic to the various parts of such pennant preventing direct metal-to-metal contact between these parts, and between such parts and other metal articles with which they may come in contact, whereby electrolytic action is either prevented or becomes greatly minimized.

When cables made of wire, especially of steel wire, are exposed to weather, they become subject to corrosion and other types of deterioration, particularly when employed for marine use. They are further subjected to chafing, causing breakage of individual wire strands, whereby the cable structure becomes weakened and dangerous to those who have to operate them. Such breakage of strands also leads to the loss of the internal lubricant usually placed in a cable, which consequently quickens the latter's deterioration. Moreover, the unprotected parts of cables and articles made therefrom are subject to electrolytic action, especially where metal-to-metal contact takes place, such as between the anchor chain and the hardware on boats or ships through mooring pennants. Such action usually weakens the fittings in a pennant cable and reduces its normal security factor.

In order to eliminate the aforestated dangers, the present invention provides a method of preserving the cable structure and articles made therefrom in covering them with one or several protective layers, by first applying such protective layers to the individual disassembled parts of such articles, and finally to the assembled articles, as, for instance, in mooring pennants, and which protective layers preserve not only the cables and pennant fittings against deterioration due to rust, electrolytic action and loss of lubricant, but also render any thus covered articles more or less abrasion-proof, enhance their appearance and render them more comfortable and secure in handling.

The protective covering employed for wire cables and articles using wire cables in conjunction with other metallic and non-metallic instrumentalities preferably constitutes a thermoplastic composition consisting of finely divided particles of vinyl resin and suitable pigments, suspended in a non-solvent plasticizer.

In order to render such composition workable, that is suitable to serve as a readily applicable coating for articles, no active organic solvents are used, but advantage is taken of the thermoplasticity of the resin and the increased solvent action of the plasticizer, when the composition becomes heated.

Thus, when its temperature is raised to the required degree, the composition becomes sufficiently fluid to permit the coating of articles. When completely coated the articles are subjected to a baking period. The applied baking heat causes the coating to fuse into a tough, flexible, abrasion-resistant, fatigue-resistant, weather-resistant and water- and lubricant-impervious film.

In the present method of applying plastic covering, the following principal steps take place: The cable or an article made therefrom is first heated to approximately 350° Fahrenheit and, while hot, is dipped into the viscous solution of the aforedescribed thermoplastic composition. The heat of the cable or of the article renders the composition sufficiently fluid to infiltrate the uppermost wire strand layers of the cable, to completely cover the cable's outer surface and to cause the composition to adhere to the cable. The coating is now permitted to dry. This is done by suspending the cable and allowing surplus coating material to drip off. When the coating is dry and sets, the cable is subjected to a short baking period at a sufficient temperature to fuse the coating into a continuous film. The thickness of such coating depends upon many factors, such as the period of time during which the cable or the article to be coated is left in the solution, on the period of time the cable cools, and of course upon the dimension, the volume and weight of the cable.

As an example, to coat a mooring pennant in which a $\frac{7}{16}$ diameter wire rope and metal thimble are used, each part is heated to about 350° F. and dipped in the composition for a period of say five minutes. Immediately after the dipping period the pennant parts are dried by suspending them for about forty-five minutes, during which time the fluid surplus of the solution is permitted to drip off. When the coated pennant parts are dry, they are individually baked for say five minutes at approximately 350° F. Now the baked parts are assembled and in their assembled stage are re-heated, re-coated, dried and re-baked. That procedure is repeated until the protective coating reaches the desired thickness.

Obviously, the coating of larger sized mooring pennants, cables of different diameters, volumes and weights will require different first heating periods at different temperatures for the dipping procedure; similarly the drying and dripping time will have to be suitably altered, and the baking temperatures and the baking periods will vary also. However the principal steps of the above outlined coating method will remain substantially the same.

The purpose and advantages of the present invention will become more clearly understood from the following description in conjunction with the accompanying drawings, intended for explanatory purposes, without restriction upon the instant disclosure, and in which drawings:

Fig. 1 illustrates a light-weight mooring pennant;

Fig. 2 represents a typical cross section through a cable, or an enlarged wire rope of the pennant, taken along line 2—2 of Fig. 1;

Fig. 3 is an enlarged illustration of the pennant shackle;

Fig. 4 is an enlarged section taken on line 4—4 through Fig. 3; and

Fig. 5 is an exploded section through the mooring pennant wire rope and the thimble prior to uniting these parts in the shackle portion of the pennant.

Referring now specifically to the figures, numeral 10 denotes the wire rope or cable portion of the pennant, which latter is provided with larger and smaller end loops, indicated, respectively, at 11 and 12. The smaller loop is called the shackle, and at its interior portion there is usually provided a thimble 13, shown in cross section in Figs. 4 and 5. The body of the pennant cable and the ends of the loops are usually fastened together by suitable splice locks, denoted by numeral 14 in Fig. 3. Thimble 13 may be made either of metal, such as stainless steel, brass, bronze, aluminum etc. or from non-metallic material, such as strong plastic, fibre, hard rubber and the like.

The usual cable construction, as clearly seen in Fig. 2, comprises a lubricant-carrying core 15, about which is grouped an arrangement of wires 16, forming the center of the cable. Around this center are placed similarly grouped wires or wire strands. The surfaces of all wire groups are designed to touch one another, and the surfaces of the wires of one group are intended to touch the surfaces of the wires of the next adjacent group. Thus only very little space is left between the individual wires, however, that little space is sufficient to hold an adequate quantity of lubricant to preserve the cable, reduce friction between its wire strands, and to keep the cable pliable.

In accordance with the present invention it is proposed to trap the lubricant in the cable structure. For that purpose it is preferred to first apply to the exterior cable surface a relatively thin coating of the aforedescribed thermoplastic. The cable is heated and is placed into the relatively non-volatile, substantially viscous plastic solution, which latter, being subjected to heat of the cable body, liquefies sufficiently to penetrate into the outer layers of wires, thus filling the outer spaces between the individual wire strands, and covering the exterior cable surface in the manner clearly seen in Fig. 2. This first coating is indicated at 17. In order to render that coating uniform, the cable is removed from the solution and is suspended, the surplus coating material drips off and the retained coating layer is permitted to become dry. Now the cable is baked. The thickness of the coating may be increased by repeating the process of first heating the cable, dipping it in the thermoplastic solution, permitting another layer of plastic to adhere to the first layer, allowing the surplus plastic of the second layer to drip off by suspending the cable and baking the cable a second time.

A cable provided with a second coating 17' is shown in Fig. 5. In that figure thimble 13 is illustrated having a first coating 17 applied to its outer surface. When the thimble is associated with shackle 12, in the manner illustrated in Fig. 4, the entire pennant, or the shackle itself, are subjected to repeated applications of plastic coating until the plastic fills the spaces between the cable body and the thimble, and the outer surface of the shackle presents a smooth, rounded appearance. The added plastic coating is indicated at 17" in Figs. 2 and 4.

The provision of a plastic interlayer between the metallic thimble body and the wire strands of the cable effectively prevents electrogalvanic action between these two parts. Moreover the plastic layer at the interior surface of the thimble precludes similar deteriorating effects between the thimble and any metal part with which it comes in contact.

The plastic coating applied to the outer surface of the cable body permanently locks in place the cable lubricant placed between the wire strands as indicated at 18, thus enhancing the life of the cable and preserving its initial flexibility. Outer coating 17" is not only impervious to water and lubricant, but, as stated, is also highly resistant to abrasion.

From the foregoing it will be obvious that a cable treated in accordance with the provision of the present invention will not only retain its efficiency for a much longer period of time, but is safer in handling, prevents electrolytic action, and especially resists marine deterioration.

Although the device illustrated in the drawings is relatively light in weight and short in length, much heavier and longer pennants are in frequent use. For such longer structures it is practicable to apply the different layers of solvent-poor thermoplastic material to successive sections of the device.

During the baking step of the present method it is preferred that the cable parts are held in straight, stretched position. Inasmuch as long pennants or cables would require baking ovens of excessive, and therefore impractical length dimensions, suitable modifications in the application of the thermoplastic are deemed obvious.

While in the foregoing a specific method is disclosed and a specific structure of a cable and of a mooring pennant is shown and described, it is obvious that changes both in the process as well as in the construction of the cable and the articles made therefrom may have to be made to adapt the present invention to different uses, and it is therefore to be understood that such changes may be made without departing from the scope of the present invention as covered by the annexed claim.

I claim:

A mooring pennant comprising a wire cable body, a lubricant-bearing core therein, lubricated wire strands twisted around said core, said cable at each end having a portion thereof turned back and secured by a clamp to the cable thereby forming a loop at each end, a metal thimble having a coating of thermoplastic material closely fitting within one of said loops, the entire cable body including the thimble and clamp having a continuous undercoating of a thermoplastic material which penetrates and covers the outer portion of the wire cable body and fully seals the lubricant in position within the cable, and an exterior layer of said thermoplastic material completely covering and merging into the sealing undercoating of the pennant and also completely covering all portions of the pennant structure.

GEORGE BAILHE.

REFERENCES CITED

The following references are of record in the file of this patent:

UNITED STATES PATENTS

| Number | Name | Date |
|---|---|---|
| 1,601,270 | Tippett | Sept. 28, 1926 |
| 1,747,940 | Kienle | Feb. 18, 1930 |
| 2,028,157 | Hodson | Jan. 21, 1936 |
| 2,067,405 | Mayne | Jan. 12, 1937 |
| 2,095,843 | Sullivan | Oct. 12, 1937 |
| 2,162,130 | Somerville | June 13, 1939 |
| 2,184,502 | Metcalf | Dec. 26, 1939 |
| 2,427,507 | Powell, 3d et al. | Sept. 16, 1947 |

FOREIGN PATENTS

| Number | Country | Date |
|---|---|---|
| 4,455 | Great Britain | 1900 |